(12) United States Patent
Endoh et al.

(10) Patent No.: US 10,095,955 B2
(45) Date of Patent: Oct. 9, 2018

(54) OBJECT RETRIEVAL APPARATUS AND OBJECT RETRIEVAL METHOD

(71) Applicant: KABUSHIKI KAISHA TOSHIBA, Tokyo (JP)

(72) Inventors: Yusuke Endoh, Kanagawa (JP); Hiromasa Shin, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 97 days.

(21) Appl. No.: 14/843,667

(22) Filed: Sep. 2, 2015

(65) Prior Publication Data

US 2016/0071277 A1   Mar. 10, 2016

(30) Foreign Application Priority Data

Sep. 5, 2014   (JP) ................. 2014-181632

(51) Int. Cl.
*G06K 9/62*     (2006.01)
*G06K 9/00*     (2006.01)
*G06K 9/46*     (2006.01)

(52) U.S. Cl.
CPC ....... *G06K 9/6202* (2013.01); *G06K 9/00664* (2013.01); *G06K 9/469* (2013.01)

(58) Field of Classification Search
None
See application file for complete search history.

(56) References Cited

U.S. PATENT DOCUMENTS

| 7,609,258 | B2 | 10/2009 | Suzuno et al. | |
| 2003/0088563 | A1* | 5/2003 | Yamane | G06F 17/30256 |
| 2003/0187867 | A1* | 10/2003 | Smartt | G06F 17/30241 |

(Continued)

FOREIGN PATENT DOCUMENTS

| JP | 5-266213 | 10/1993 |
| JP | 2001-513925 | 9/2001 |

(Continued)

OTHER PUBLICATIONS

A Method to Improve Metric Index VP-tree for Multimedia Databases. Shishibori. Jan. 2011.*

*Primary Examiner* — Delomia L Gilliard
(74) *Attorney, Agent, or Firm* — Finnegan, Henderson, Farabow, Garrett & Dunner, L.L.P.

(57) ABSTRACT

An object retrieval apparatus includes a storage and a retrieval. The storage stores first to N-th space index information relating to $X_1$ objects to $X_N$ objects which are selected in a descending order of an object size from among a plurality of objects, and in which a value of $X_T$ (where T is a value from 1 to N) decreases as a value of T increases. The retrieval processor divides a sight range into a plurality of pieces according to distance from a sight point, assign a different one of the first to N-th space index information to each divided range such that a smaller index number of the space index information is assigned to the divided range closer to the sight point, and specifies an object having a size visible from the sight point among objects existing in each divided range by retrieving the assigned space index information.

10 Claims, 8 Drawing Sheets

(56) References Cited

U.S. PATENT DOCUMENTS

| | | | | |
|---|---|---|---|---|
| 2007/0103480 A1* | 5/2007 | Suzuno | ............... | G06T 17/05 345/582 |
| 2010/0332475 A1* | 12/2010 | Birdwell | ........... | G06F 17/30333 707/737 |
| 2013/0057550 A1 | 3/2013 | Kishikawa et al. | | |
| 2013/0238541 A1* | 9/2013 | Endoh | ................ | G06T 17/30 706/46 |
| 2013/0290648 A1* | 10/2013 | Shao | ............... | G06F 12/04 711/154 |
| 2014/0229473 A1* | 8/2014 | Mehrotra | ........... | G06F 17/3069 707/728 |
| 2016/0071277 A1* | 3/2016 | Endoh | ................ | G06K 9/6202 382/103 |

FOREIGN PATENT DOCUMENTS

| | | |
|---|---|---|
| JP | 2002-324069 | 11/2002 |
| JP | 2006-317764 | 11/2006 |
| JP | 2007-72227 | 3/2007 |
| JP | 2007-132972 | 5/2007 |
| JP | 2011-186960 | 9/2011 |
| JP | 2012-98186 | 5/2012 |
| JP | 2012-150823 | 8/2012 |
| JP | 2013-97573 | 5/2013 |
| JP | 2013-190849 | 9/2013 |
| JP | 2014-59839 | 4/2014 |

* cited by examiner

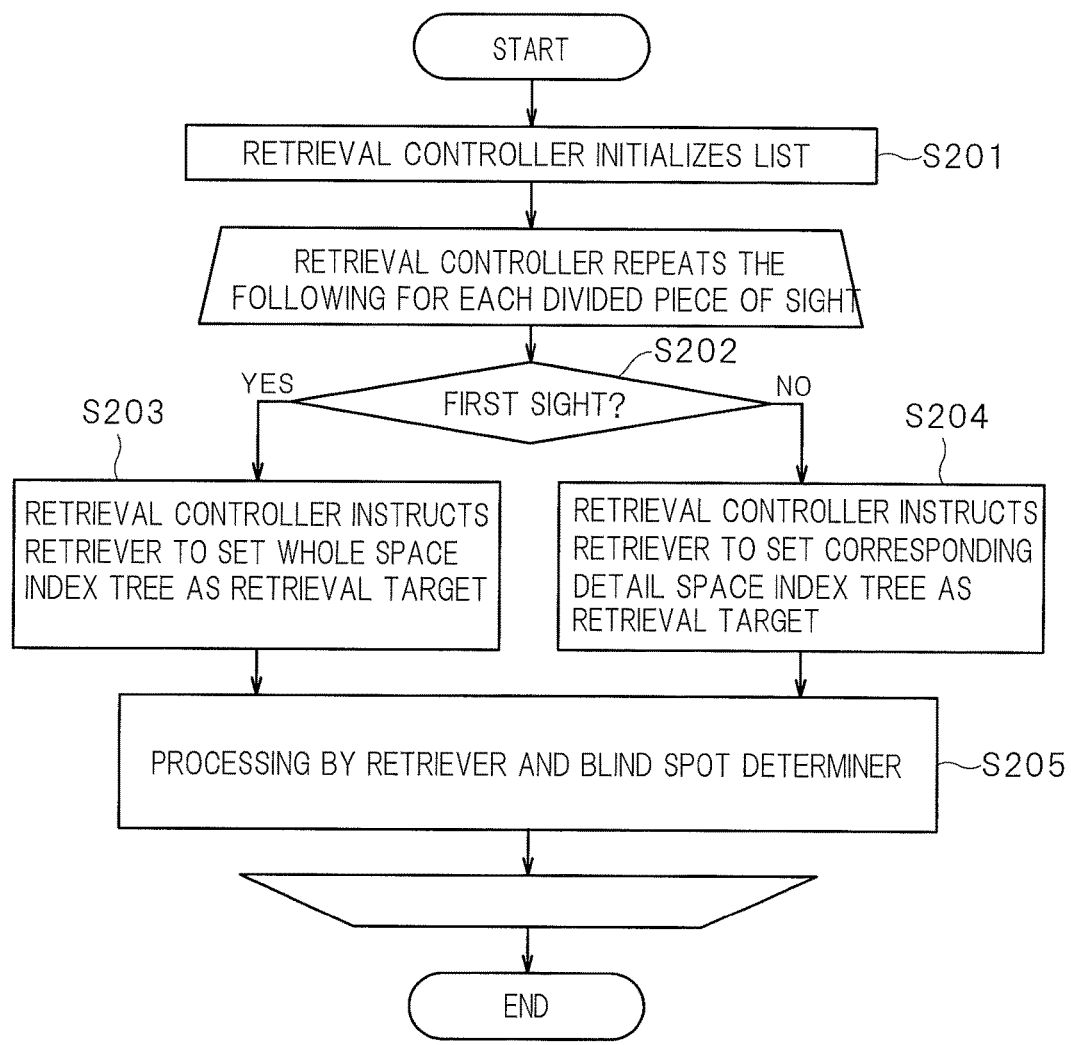
F I G. 3

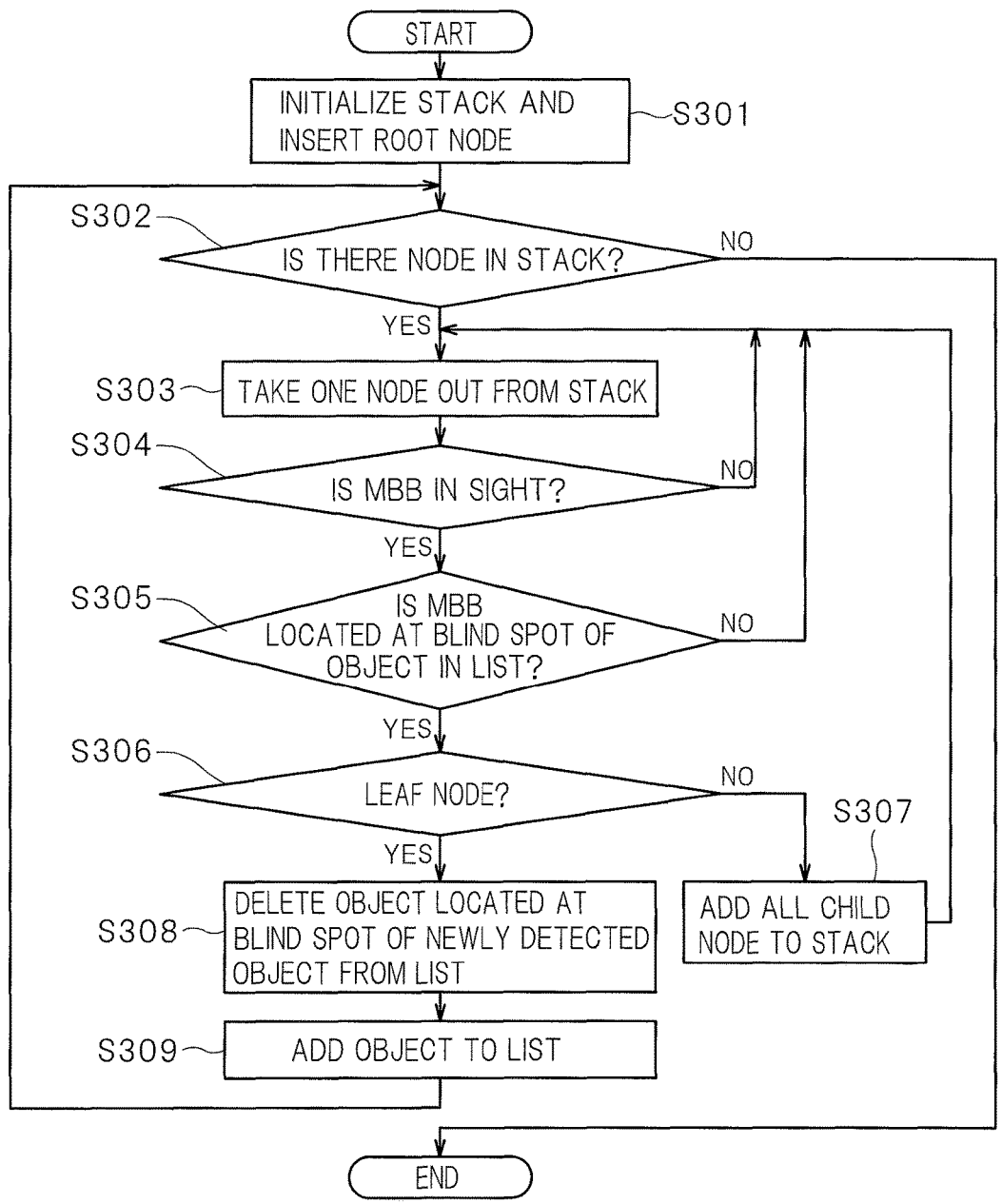
F I G. 4

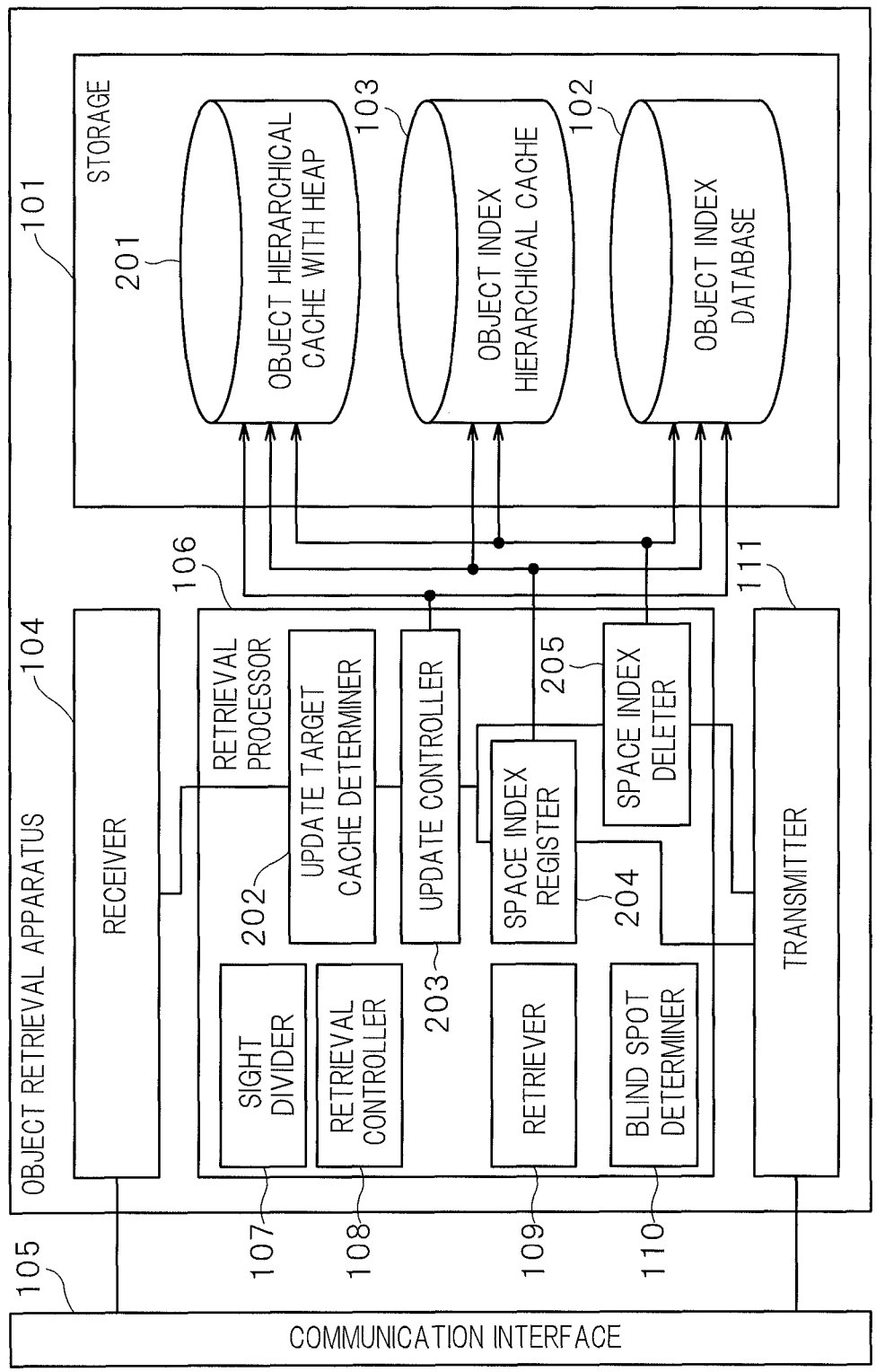
F I G. 5

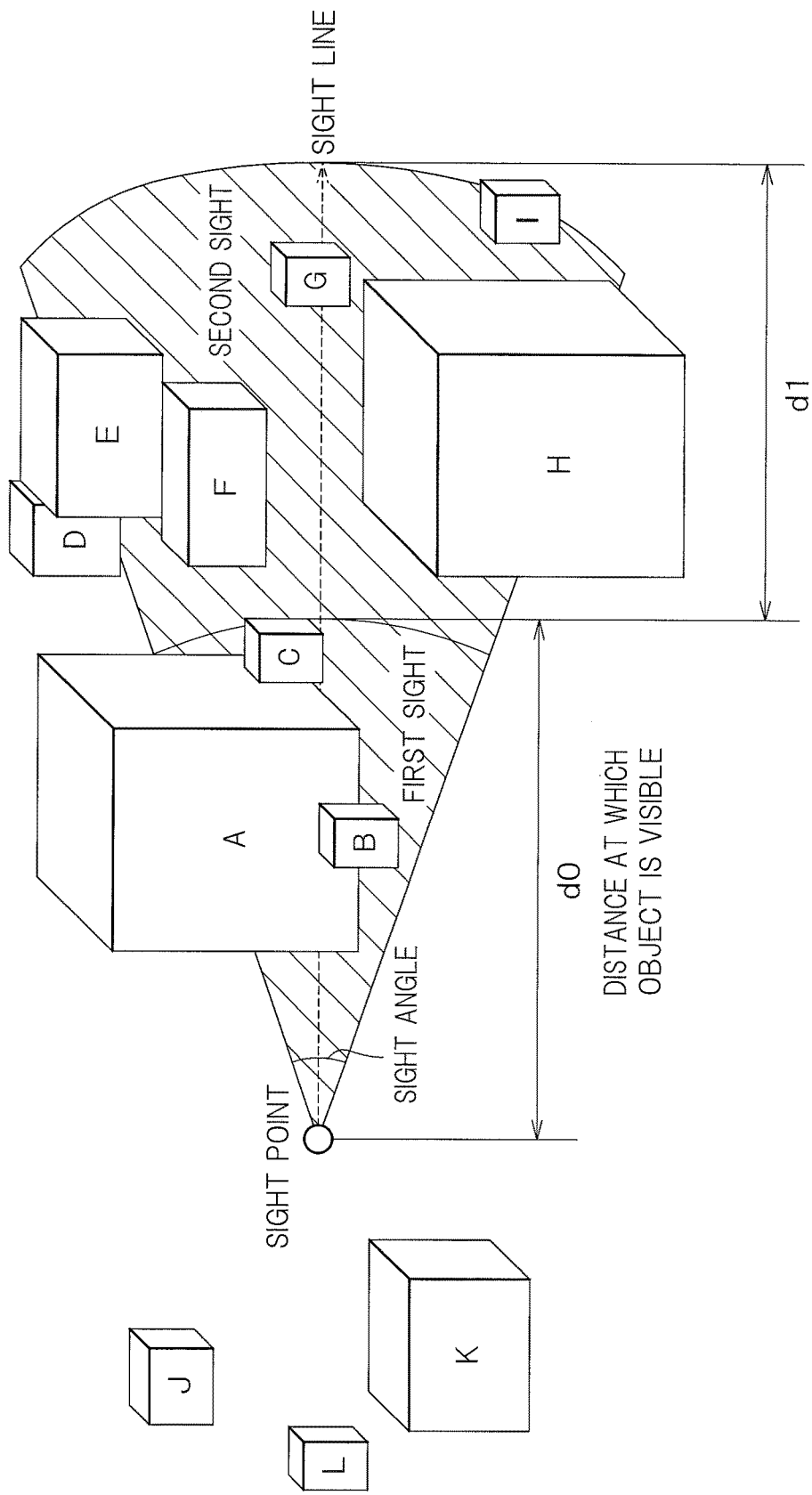
F I G. 6

OBJECT RETRIEVAL APPARATUS AND OBJECT RETRIEVAL METHOD

CROSS-REFERENCE TO RELATED APPLICATIONS

This application is based upon and claims the benefit of priority from Japanese Patent Application No. 2014-181632, filed Sep. 5, 2014; the entire contents of which are incorporated herein by reference.

FIELD

Embodiments described herein relate to an object retrieval apparatus and an object retrieval method.

BACKGROUND

Conventionally, there is known a method for detecting an object (visible object) visible from a designated point among objects existing in three dimensional space of a geographical information system. The method includes 3 stages: (1) detecting an object existing in sight, (2) determining, through rendering, geometric determination, or the like, whether or not the detected object is an invisible object such as an object which is located in the far distance and thus substantially invisible, and an object located at a blind spot of another object and (3) deleting the object determined as invisible. However, this detection lacks high speed performance.

BRIEF DESCRIPTION OF THE DRAWINGS

FIG. 3 is a processing flowchart of a retrieval controller;

FIG. 4 is a processing flowchart of a retriever and a blind spot determiner;

FIG. 5 is a diagram illustrating arrangement of objects in the embodiment;

FIG. 6 is a diagram illustrating a structure of whole space index tree in the embodiment;

DETAILED DESCRIPTION

According to one embodiment, an object retrieval apparatus includes a storage and a retrieval processor.

The storage stores first to N-th space index information relating to $X_1$ objects to $X_N$ (where N is an integer of 2 or greater) objects each set of which are selected in a descending order of an object size from among a plurality of objects disposed in three dimensional space, and in which a value of $X_T$ (where T is a value from 1 to N) decreases as a value of T increases.

The retrieval processor divides a sight range into a plurality of pieces according to distance from a sight point in the three dimensional space.

The retrieval processor assigns a different one of the first to N-th space index information to each divided range such that a smaller index number of space index information of the first to N-th space index information is assigned to the divided range closer to the sight point. Incidentally, the index number is "X" at head of X-th (X=1, 2, . . . N) space index information. For example, the index number is 1 in case of the first space index information, and the index number is N in case of the N-th space index information, for example.

The retrieval processor specifies an object having a size visible from the sight point among objects existing in each divided range by retrieving the space index information assigned to each divided range.

Hereinafter, embodiments will be described with the accompanying drawings.

Figure 1:
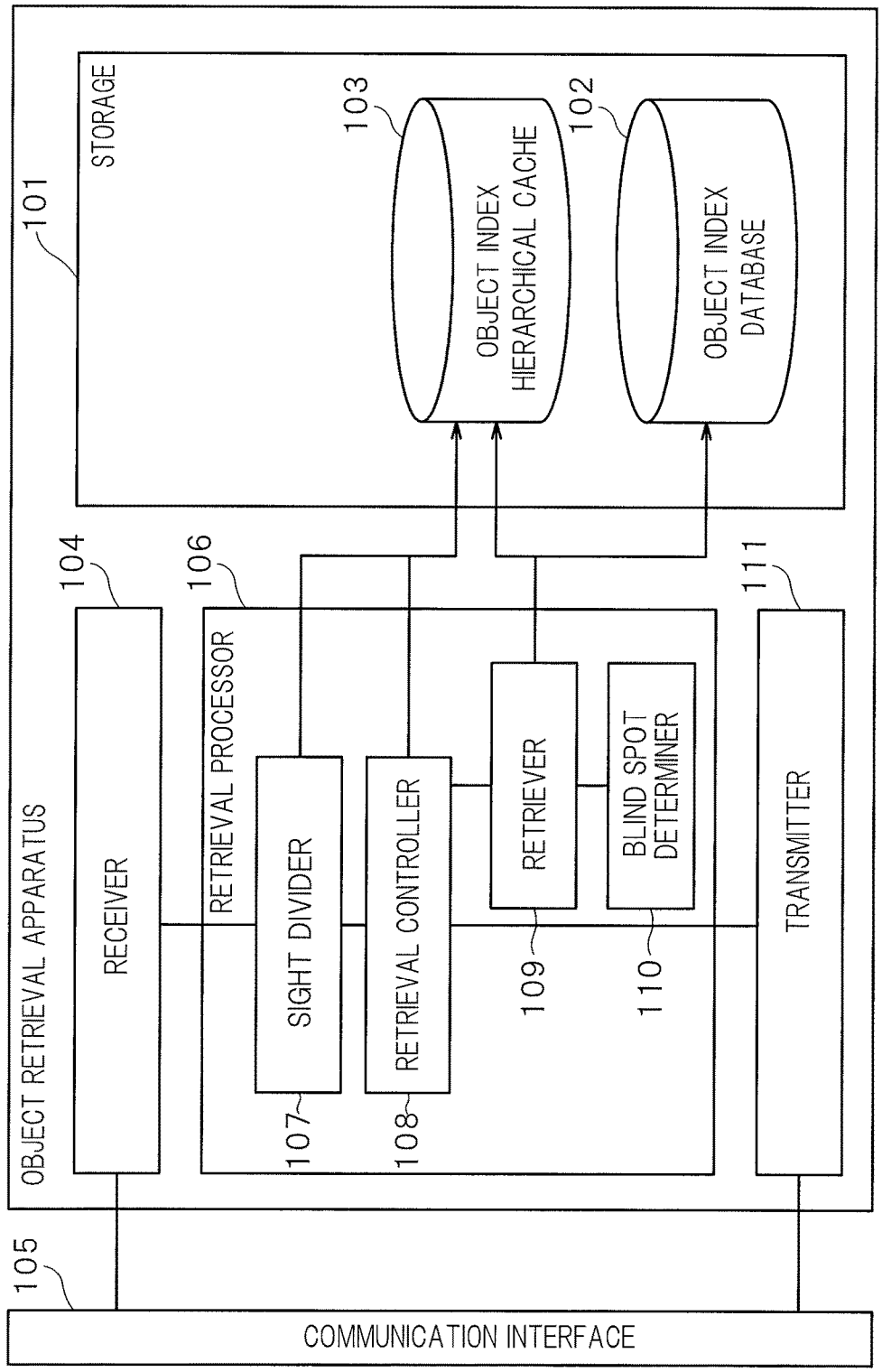
FIG. 1 is a block diagram of one embodiment of the present invention.
Figure 2:
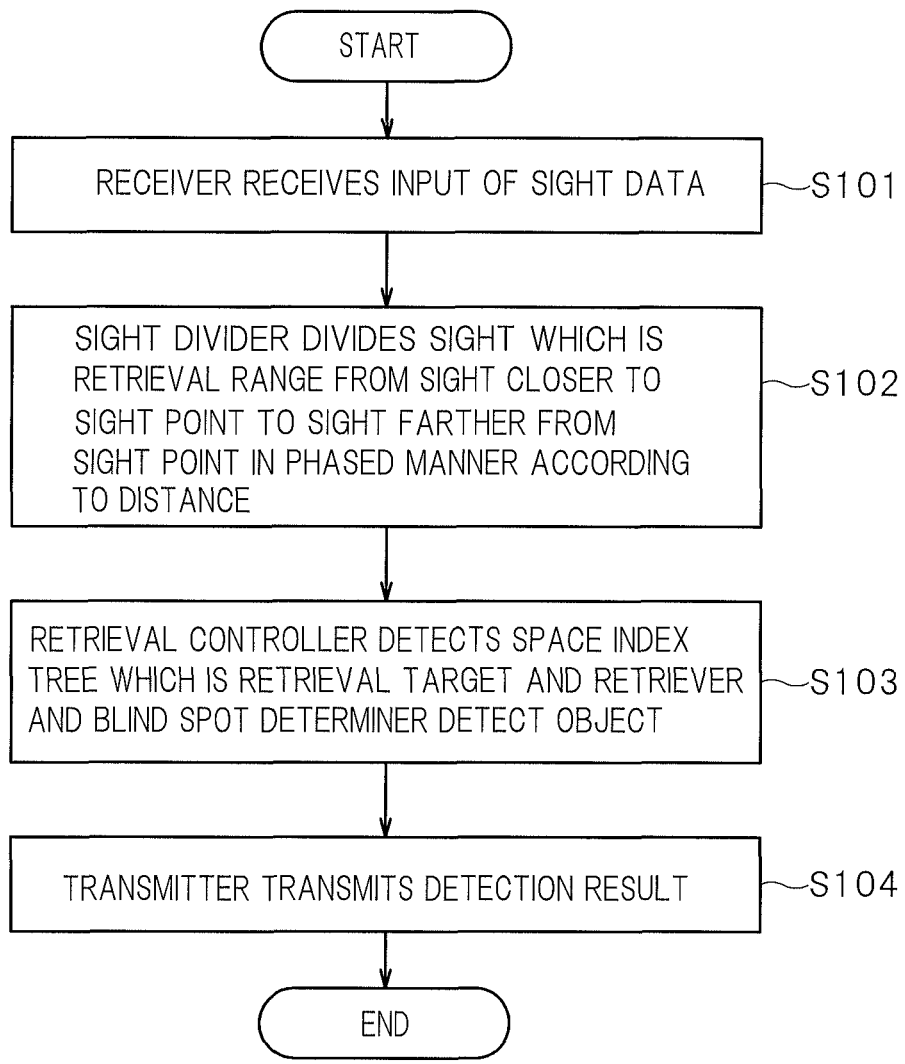
FIG. 2 is a processing flowchart of one embodiment of the present invention.

FIG. 1 illustrates one embodiment of the present invention. Further, FIG. 2 is a processing flowchart of one embodiment of the present invention.

A storage 101 includes an object index database 102 and an object index hierarchical cache 103. The storage 101 may be configured by a memory, an HDD, an SSD, or the like.

The object index database 102 stores space index information including information such as IDs, positions and sizes of all the objects disposed in three dimensional space. The space index information is in a form of a space index tree (whole space index tree). The shape of each object may be a cuboid or an arbitrary three dimensional shape. In the case of the arbitrary three dimensional shape, the size of the object is set to be the size of a minimum bounding box (MBB) which is a minimum cuboid capable of enclosing the object.

The space index tree has a data structure for realizing high speed of retrieval processing. The space index tree constitutes a tree structure in which a plurality of nodes connect to one node located in the highest layer, and, further, a plurality of nodes connect to each node of the plurality of nodes. The node located in the highest layer is referred to as a root node, nodes located in the lowest layer are referred to as leaf nodes, and nodes located between the root node and the leaf nodes are referred to as intermediate nodes. One object is assigned to each leaf node, and the object holds information of an MBB which encloses one object held by the leaf node. An intermediate node holds information of an MBB which encloses all the objects held by leaf nodes located in lower layers than a layer of the intermediate node. The root node holds information of an MBB which encloses all the objects assigned to the leaf nodes of the space index tree. Examples of the whole space index tree can include an R tree and an octree. While information of all the objects disposed in the three dimensional space is held in the form of the space index tree (whole space index tree) here, it is also possible to hold information of the objects in another type of a structure such as a list structure as long as information of all the objects can be held.

The object index hierarchical cache 103 stores space index information playing an auxiliary role of the whole space index tree in a form of a space index tree (detail space index tree). The object index hierarchical cache 103 stores one or a plurality of detail space index trees. Each detail space index tree holds only a given number of objects having largest sizes or a given percentage of objects having largest sizes among all, and, if there are a plurality of detail index trees, the number of held objects may vary for each detail space index tree, for example, one detail space index tree holds only objects whose size of an MBB is included in the top 10% of all, and another detail space index tree holds only objects included in the top 1% of all. While the detail space index tree is defined to hold a given number of objects having largest sizes or a given percentage of objects having largest sizes here, the number or the percentage does not have to be fixed. Possible detail space index tree includes an R tree and an octree. While information of the objects in the higher layers is held in the form of a space index tree (detail space index tree) here, it is also possible to hold the information in another type of a structure such as a list structure as long as information of all the objects can be held.

A receiver 104 receives input of data relating to sight which is an object retrieval range through a communication interface 105 (S101). This data may include data including information indicating a positional vector of a sight point, a directional vector of a sight line and a degree of a sight angle or data which can be converted from and into these data. This data is used to determine a sight point and a sight range in the three dimensional space. It should be noted that the data may be input by calling API in software in addition to data communication via a network. The receiver 104 transmits the received data to a retrieval processor 106.

The retrieval processor 106 includes a sight divider 107, a retrieval controller 108, a retriever 109 and a blind spot determiner 110.

The sight divider 107 divides sight (i.e., sight range) expressed by the data received at the receiver 104 into a plurality of pieces according to distance from the sight point (S102). The pieces forming the range corresponds to divided ranges. It should be noted that a piece of sight located closest to the sight point (i.e., the divided range located closest to the sight point) is referred to as first sight (first divided rage), a piece of sight located the second closest is named as second sight (second divided rage), and a piece of sight located the third closest is named as third sight (third divided rage). The number of pieces of sight (i.e., the number of the divided ranges) generated by this division is set to be equal to or less than a sum of whole space index trees and detail space index trees stored in the storage 101.

The distance which becomes a reference value used for division may be input by a user, may be held in advance in the detail space index tree or may be calculated by the sight divider 107.

When the sight divider 107 is made to calculate the distance, the sight divider 107 retrieves a minimum object held by each detail space index tree and calculates bounded distance at which the minimum object is distant and substantially invisible from the sight point. This bounded distance becomes a reference value used for division.

The bounded distance at which the minimum object is distant and thus substantially invisible can be calculated by calculating distance at which the size of an object is equal to or smaller than a pixel size when the object is rendered or by calculating distance at which an apparent diameter is equal to or less than a given value in a range reached by reflected sunlight.

Possible methods for detecting a minimum object held by each detail space index tree include a method in which all the objects are retrieved, and a method in which an index tree in a data structure for enabling efficient detection of a minimum element such as a heap is newly stored in the storage 101 and retrieval is performed for the index tree.

When the sight divider 107 is made to calculate division reference using the index tree in a data structure for enabling efficient detection of a minimum element such as a heap, it is possible to avoid the trouble of adding distance to the detail space index tree in advance.

The retrieval controller 108 designates a detail space index tree to be retrieved for each piece of sight divided by the sight divider 107 (S103). The retrieval controller 108 designates a whole space index tree for the first sight which is the closest to the sight point, and designates detail space index trees corresponding to the divided distance for the respective pieces of sight such as the second sight and the third sight, other than the sight closest to the sight point.

The retriever 109 recursively executes retrieval on the space index tree designated as a retrieval target by the retrieval controller 108 from a root node located at the highest layer of the space index tree toward leaf nodes located at the lowest layer, and determines whether or not an MBB which encloses all the objects held by each node exists within sight (S103). "All the objects held by a node" refers to objects assigned to all the leaf nodes located in the lower layers than the layer of the node. Therefore, when the node is a root node, the MBB which encloses all the objects held by the node is an MBB which encloses all the objects. When the node is an intermediate node, the MBB is an MBB which encloses all the objects held by nodes in the lower layers than the layer of the intermediate node. When the node is a leaf node, the MBB is an MBB which encloses one object held by the leaf node.

This determination method can include a method in which sight which is a retrieval range is expressed with a steric object such as a cone and a quadrangular pyramid, and whether or not this steric object interferes with the above-described MBB is examined.

The blind spot determiner 110 determines whether the target object is located at a blind spot of another object (S103).

These determination methods can include a method in which rendering is performed, and when the object is not rendered at all, it is determined that the object is located at a blind spot, and geometric determination.

The transmitter 111 transmits a list of objects transmitted from the retrieval controller 108 to a network, or the like, via the communication interface 105 (S104).

Object detecting processing by the retrieval controller, the retriever and the blind spot determiner will be described in detail. FIG. 3 illustrates a series of procedure by the retrieval controller 108. FIG. 4 illustrates a series of procedure by the retriever 109 and the blind spot determiner 110.

First, the retrieval controller 108 initializes a list to which objects are to be put in (S201). Then, the following is repeated until retrieval is performed for all the divided pieces of sight which are retrieval targets. It is determined whether the retrieval target is the first sight located closest to the sight point (S202). If the retrieval target is the first sight (S202: Yes), the retrieval controller 108 instructs the retriever 109 to set the whole space index tree as the retrieval target (S203). If the retrieval target is not the first sight (S202: No), the retrieval controller 108 instructs the retriever 109 to set the corresponding detail space index tree as the retrieval target (S204).

The retriever 109 which receives an instruction as to the retrieval target, initializes a stack and inserts a root node of the space index tree (S301). Then, the retriever 109 repeats the following until the stack becomes empty (S302: Yes). One node is taken out from the stack (S303), and it is determined whether all the objects held by the node are located in sight by determining whether an MBB interferes with a solid (i.e., three dimension solid) indicating divided pieces of sight (S304). If the MBB does not interfere with the solid, all the objects held by the node are determined as out of sight (S304: No), and the processing returns to the start (S302) of this loop. If the MBB interferes with the solid, all the objects held by the node are determined as in sight (S304: Yes), and the blind spot determiner 110 determines whether an MBB of all the objects held by the node is located at a blind spot of an object in the list (S305). If it is determined that the MBB is located at the blind spot (S305: No), the processing returns to the start (S302) of this loop. If it is determined that the MBB is not located at the blind spot (S305: Yes), the retriever 109 determines whether this node is a leaf node (S306). If this node is not a leaf node (S306: No), all the child nodes held by this node are inserted into the stack (S307), and the processing returns to the start (S302) of this loop. If this node is a leaf node (S306: Yes), the blind spot determiner 110, in contrast to the previous process, determines whether the objects in the list are located at a blind spot of the object newly detected this time and deletes the object determined to be located at the blind spot from the list (S308). The object detected this time is added to the list (S309). Then the processing returns to the start (S302) of the loop. When retrieval of the last leaf node is finished, because the stack becomes empty and this loop is finished (S302: No), processing for this sight is finished, and processing for the next sight (S202) follows. If processing is performed for all pieces of sight, the processing is completed.

In the flow of FIG. 4, if the MBB including all the objects held by the node does not interfere with the sight (S304: No), and, if the MBB is located at a blind spot of another object (S305: No), because processing of adding all the child nodes to the stack (S307) is not performed, retrieval is not performed for the child nodes of the node, because it is obvious that objects held by the child nodes of the node do not interfere with the sight or are located at a blind spot of another object. This flow makes it possible to reduce the number of times of retrieval, so that it is possible to efficiently perform the retrieval with a less memory overhead.

It should be noted that upon retrieval, it is not necessary to copy the space index tree from the storage 101, and it is only necessary to sequentially acquire only necessary nodes held by the space index tree.

The retrieval controller 108 creates a list of the objects detected by the retriever 109 and transmits the list to the transmitter 111. It should be noted that the retrieval controller 108 may cancel the list of the objects.

Through the above processing, the object detecting processing by the retrieval controller, the retriever and the blind spot determiner is completed.

Operation in a case where a visible object is detected in the above-described embodiment will be described below using a specific example.

FIG. 5 illustrates an example of arrangement of objects relating to geographical information. The objects are expressed by cuboids, and IDs are assigned.

FIG. 6 illustrates an example of the whole space index tree in which the objects illustrated in FIG. 5 are indexed by an R tree. The whole space index tree is stored in the object index database 102.

Each of leaf nodes 6 to 17 in the third layer holds information relating to one object among objects A to L. Each of intermediate nodes 2 to 5 in the second layer holds information relating to three adjacent objects which are put together. It should be noted that while, in the present embodiment, the number of objects held by each intermediate node is three and equal, there is a case where the number of held nodes may differ for each intermediate node.

Further, each intermediate node and a root node hold information of an MBB which encloses all the objects under the own node. In the example of FIG. 6, the node 2 holds information of an MBB including objects A, B and C. The node 1 which is a root node holds information of an MBB including all the objects of objects A to L.

Figure 7:
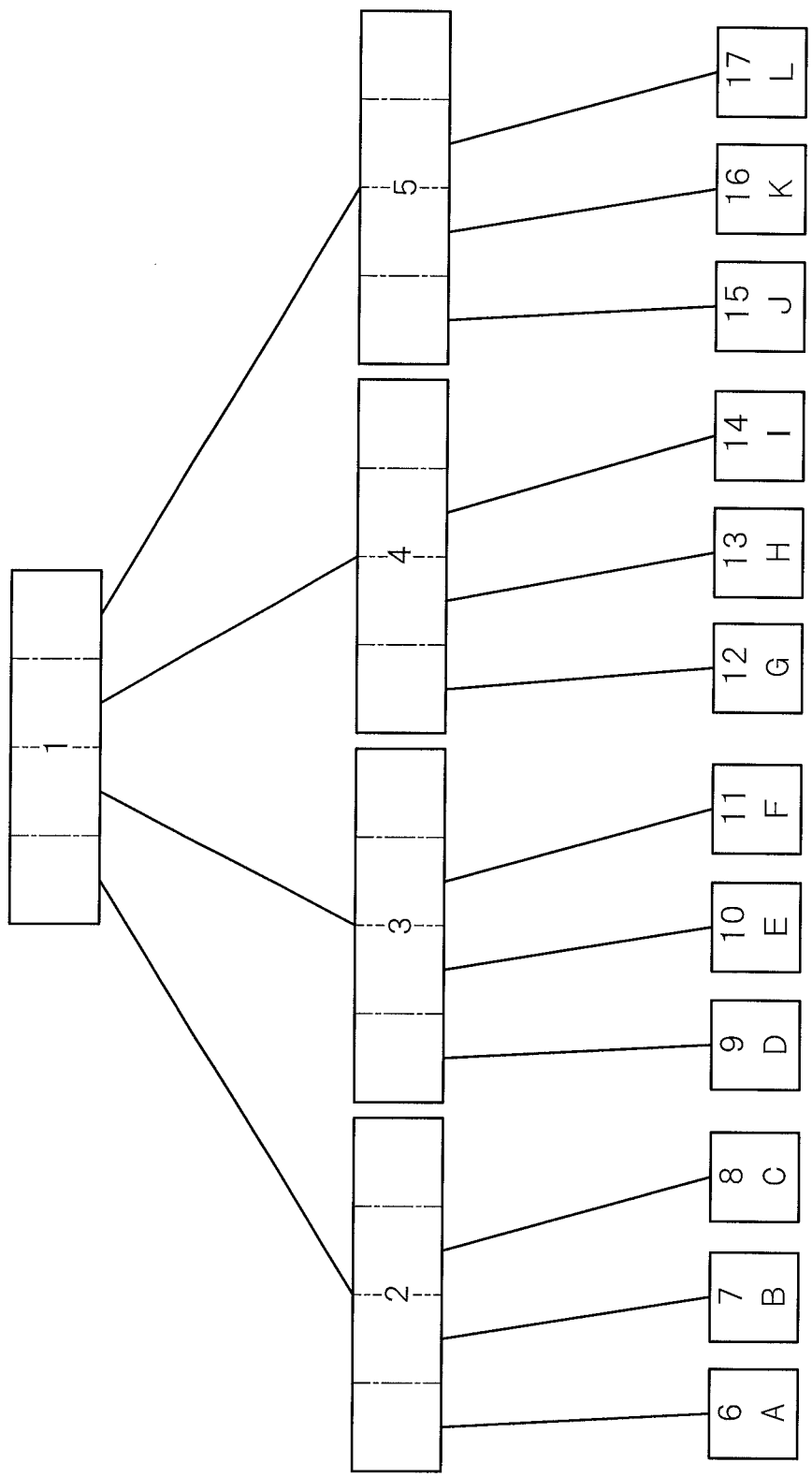
FIG. 7 is a diagram illustrating a structure of detail space index tree in the embodiment.

FIG. 7 illustrates an example of the detail space index tree in which objects are indexed by an R three. The detail space index tree is stored in the object index hierarchical cache 103. This detail space index tree holds only objects A, E, F, H, J and K which are objects having the first to sixth largest size among all the objects.

It is assumed now that the receiver 104 receives input data in which a range indicated by diagonal lines in FIG. 5 is located in sight.

The sight divider 107 calculates bounded distance at which J which is a minimum object held by the detail space index tree illustrated in FIG. 7 is visible from the sight point and obtains the value d0. The sight divider 107 then divides the sight indicated with diagonal lines illustrated in FIG. 5 with distance of d0 and sets a range within d0 as first sight and sets a range farther than d0 as second sight.

The retrieval controller 108 initializes the list (S201) and instructs the retriever 109 to set the whole space index tree illustrated in FIG. 6 as a retrieval target in the first sight (S203).

As illustrated in the flowchart of FIG. 4, the retriever 109 inserts the node 1 illustrated in FIG. 6 into the stack (S301). Because there is a node in the stack (S302: Yes), the retriever 109 takes the node 1 out from the stack (S303). It is determined whether an MBB of all the objects (objects A to L) held by the node interferes with the first sight (S304). In the present embodiment, the MBB interferes with the first sight (S305: Yes). Subsequently, the blind spot determiner 110 determines whether this MBB is located at a blind spot of an object in the list (S305). Because there is no object in the list yet, this MBB is not located at the blind spot (S305: Yes). Because the node 1 is not a leaf node (S306: No), nodes 2, 3, 4 and 5 which are child nodes of the node 1 are added to the stack (S307), and processing for the node 1 is finished.

Because there is a node in the stack (S302: Yes), the retriever 109 takes the node 2 out from the stack (S303). An MBB of all the objects (objects A, B and C) held by the node 2 also interferes with the first sight (S304: Yes). Further, there is no object in the list yet, this MBB is not located at the blind spot (S305: Yes). Still further, the node 2 is not a leaf node (S306: No). Therefore, nodes 6, 7 and 8 are inserted into the stack (S307), and processing for the node 2 is finished.

Because there is a node in the stack (S302: Yes), the retriever 109 takes the node 6 out from the stack (S303). An MBB of all the objects (only object A) held by the node 6 also interferes with the first sight (S304: Yes). Further, because there is no object in the list yet, this MBB is not located at the blind spot (S305: Yes). The node 6 is a leaf node (S306: Yes). Therefore, while processing of deleting an object located at the blind spot of the newly detected object from the list is performed, because there is no object in the list so far, deletion is not performed (S308). The object A held by the node 6 is added to the list (S309), and processing for the node 6 is finished.

Because there is a node in the stack (S302: Yes), the retriever 109 takes the node 7 out from the stack (S303). An MBB of all the objects (only object B) held by the node 7 also interferes with the first sight (S304: Yes). Further, because this MBB is not located at a blind spot of the object A in the list, this MBB is not located at the blind spot (S305: Yes). The node 7 is a leaf node (S306: Yes). Therefore, it is determined whether the object A in the list is located at a blind spot of the newly detected object B. In the present embodiment, because the object A is not located at the blind spot of the object B, the object A is not deleted (S308). The object B held by the node 7 is added to the list (S309), and processing for the node 7 is finished.

Because there is a node in the stack (S302: Yes), the retriever 109 takes the node 8 out from the stack (S303). While an MBB of all the objects (only object C) held by the node 8 also interferes with the first sight (S304: Yes), because this MBB is located at the blind spot of the object A (S305: No), processing for the node 8 is finished.

Because there is a node in the stack (S302: Yes), the retriever 109 takes the node 3 out from the stack (S303). An MBB of all the objects (objects D, E and F) held by the node 3 does not interfere with the first sight (S304: No). Therefore, processing for the node 3 is finished.

In a similar manner, because an MBB of objects held by the nodes 4 and 5 does not interfere with the first sight (S304: No), processing for the nodes 4 and 5 is finished at that point.

Because there is no more node in the stack (S302: No), processing for the first sight is finished.

Subsequently, the retrieval controller 108 instructs the retriever 109 to set the detail space index tree illustrated in FIG. 7 as a retrieval target in the second sight (S204).

The retriever 109 initializes the stack and inserts the node 1 (S301). Because there is a node in the stack (S302: Yes), the retriever 109 takes the node 1 out from the stack (S303). An MBB of all the objects (objects A, E, F, H, J and K) held by the node 1 interferes with the second sight (S304: Yes). Further, because this MBB is not located at a blind spot of the objects A and B in the list, this MBB is not located at the blind spot (S305: Yes). Further, the node 1 is not a leaf node (S306: No). Therefore, the nodes 2, 3 and 4 are inserted into the stack (S307), and processing for the node 1 is finished.

Because there is a node in the stack (S302: Yes), the retriever 109 takes the node 2 out from the stack (S303). An MBB of all the objects (objects A and H) held by the node 2 interferes with the second sight (S304: Yes). Further, because this MBB is not located at a blind spot of the objects A and B in the list, this MBB is not located at the blind spot (S305: Yes). Still further, the node 2 is not a leaf node (S306: No). Therefore, the nodes 5 and 6 are inserted into the stack (S307), and processing for the node 2 is finished.

Because there is a node in the stack (S302: Yes), the retriever 109 takes the node 5 out from the stack (S303). An MBB of all the objects (only object A) held by the node 5 does not interfere with the second sight (S304: No). Therefore, processing for the node 5 is finished.

Because there is a node in the stack (S302: Yes), the retriever 109 takes the node 6 out from the stack (S303). An MBB of all the objects (only object H) held by the node 6 interferes with the second sight (S304: Yes). Further, because this MBB is not located at a blind spot of the objects A and B in the list, this MBB is not located at the blind spot (S305: Yes). The node 6 is a leaf node (S306: Yes). It is therefore determined whether the objects A and B in the list are located at a blind spot of the newly detected object H. In the present embodiment, because the objects A and B are not located at the blind spot of the object H, the objects A and B are not deleted (S308). The object H held by the node 6 is added to the list (S309), and processing for the node 6 is finished.

Because there is a node in the stack (S302: Yes), the retriever 109 takes the node 3 out from the stack (S303). While an MBB of all the objects (objects E and F) held by the node 3 interferes with the second sight (S304: Yes), because this MBB is located at the blind spot of the object A (S305: No), processing for the node 3 is finished.

The retriever 109 takes the node 4 out from the stack (S303). An MBB of all the objects (objects J and K) held by the node 4 does not interfere with the second sight (S304: No). Therefore, processing for the node 4 is finished.

Because there is no more node in the stack (S302: No), processing for the second sight is finished.

As a result of the processing for the first sight and the second sight being finished, the objects A, B and H added to the list are transmitted to the retrieval controller 108 as visible objects. The retrieval controller 108 transmits these objects to the transmitter 111.

The transmitter 111 transmits information of the objects A, B and H transmitted from the retrieval controller 108 via the communication interface 105.

In the above-described embodiment, the detail space index tree which is stored in the object index hierarchical cache 103 and which is illustrated in FIG. 7 is utilized to perform retrieval for the second sight, because an object smaller than the object J is invisible in the second sight, and it is thus sufficient to perform retrieval using the detail space index tree in FIG. 7 which holds objects larger than the object J. Because only object H exists in the second sight among the objects held by the detail space index tree of FIG. 7, only the object H is detected.

If retrieval is performed for the whole space index tree instead of the detail space index tree, the objects D, E, F G and I are also detected. As mentioned above, these objects are invisible if they are located in distance of d0 or farther, and it is necessary to implement a step for deleting these objects.

Therefore, the embodiment of the present invention excels in that, because objects which are in the distance and which are substantially invisible are not included in the retrieval target, it is possible to omit a step of performing determination after the retrieval and deleting the objects.

Figure 8:
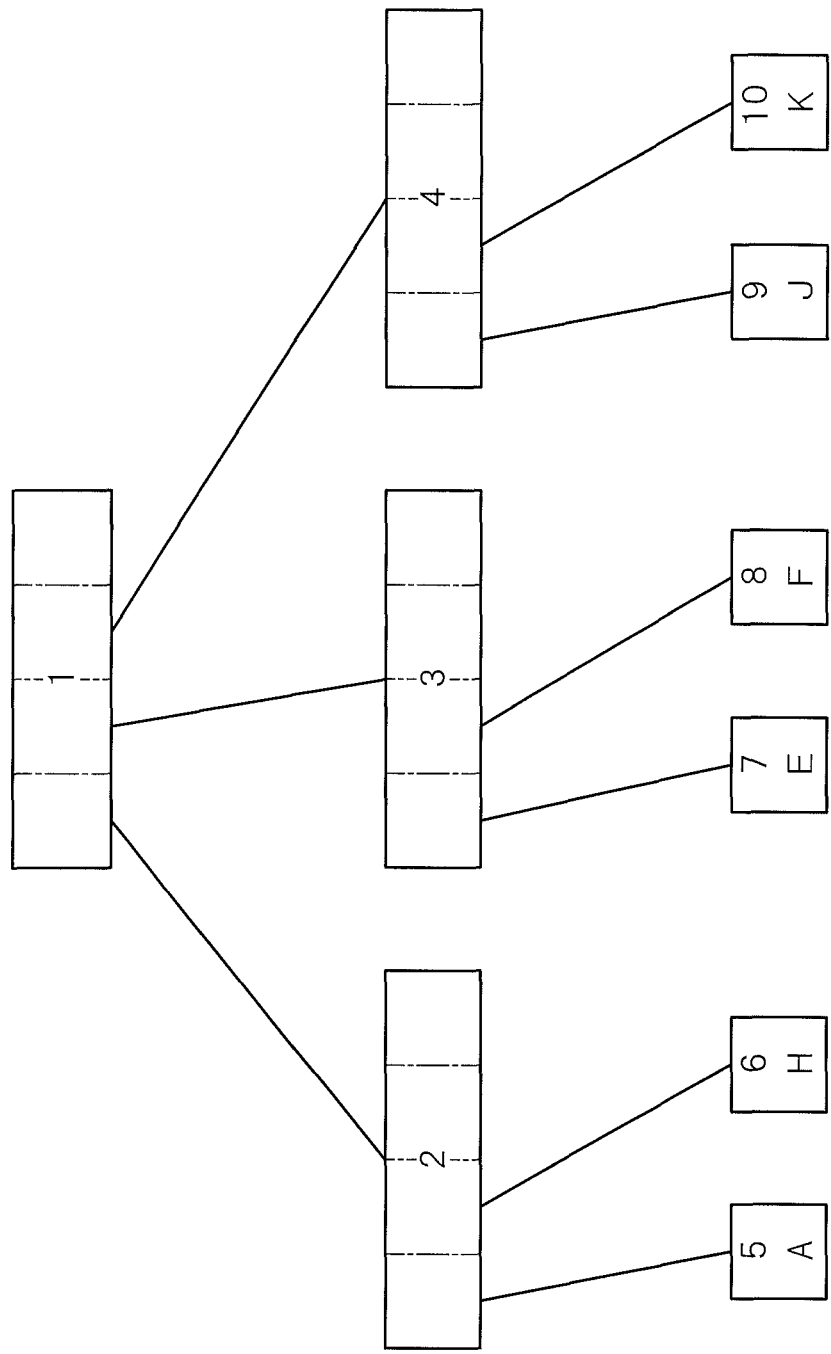
FIG. 8 is a block diagram of an embodiment in which a processor required for newly registering or deleting an object is added to FIG. 1.

FIG. 8 is a block diagram illustrating an aspect where each processor which performs processing for newly registering or deleting an object is added to the apparatus in FIG. 1.

The storage 101 includes an object index hierarchical cache with heap 201 separately from the object index database 102 and the object index hierarchical cache 103.

The object index hierarchical cache with heap 201 stores heaps corresponding to respective detail space index trees. The heap holds object information held by the corresponding detail space index tree. The heap has a data structure for efficiently detecting a minimum element, and it is possible to detect a minimum object held by the corresponding detail space index tree more quickly by performing retrieval for the heap than by performing retrieval for the detail space index tree. For example, the data structure is a binary tree, an object is assigned to each node, a root node is an object of a minimum size, and a larger object is assigned to a node closer to a terminal. In this case, by specifying the root node of the binary tree, it is possible to specify an object of a minimum size at high speed. The heap is one aspect of index information in which each object is disposed according to a size of each object under a predetermined rule, and it is also possible to employ a structure other than the heap.

The receiver 104 receives update data for newly registering or deleting an object, and transmits the update data to an update target cache determiner 202. The update data can include an ID, a position and an MBB of an object.

The update target cache determiner 202 detects a detail space index tree which requires update among the detail space index trees.

Specifically, in either case where an object is newly registered or deleted, the update target cache determiner 202 sequentially performs retrieval for the heap group stored in the object index hierarchical cache with heap 201. The retrieval is preferably performed in an order from a heap holding objects of the largest size, for example, a heap holding only objects whose size of an MBB is in the top 10% of all, and then, a heap holding only objects whose size of an MBB is in the top 1% of all. A minimum object held by the heap for which retrieval is to be performed is detected, and the size of an MBB of the detected minimum object is compared with the size of an MBB of an object to be registered.

In the case where an object is newly registered, when the MBB of the minimum object of the heap is larger than the MBB of the object to be registered, retrieval is performed for the next heap. When the MBB of the object to be registered is larger than the MBB of the minimum object of the heap, it turns out to be necessary to update the heap and the detail space index tree corresponding to the heap. Because the heap and the detail space index tree hold only a given number of objects having largest sizes, a newly registered object is included in a given number of largest objects, and an object which has been a minimum so far deviates from the given number of largest objects. It is then necessary to update all the heap and the detail space index tree in which objects whose size is smaller than that of the objects in the heap and the detail space index tree which are proved to be the retrieval target are registered, because the minimum object which has deviated from the given number of largest objects is added to the heap and the detail space index tree in the lower layer, a minimum object in the lower layer deviates from the layer, and the same is repeated in the further lower layers.

On the other hand, in the case where an object is deleted, when the MBB of the minimum object of the heap is smaller than the MBB of the object to be registered, because it is understood that the heap and the corresponding detail space index tree hold an object to be deleted, it turns out to be necessary to update the heap and the corresponding detail space index tree. Further, it is necessary to perform update all the heap and the detail space index tree which register objects whose size are smaller than that of the objects in the heap and the detail space index tree turned out to be the update target because they hold objects to be deleted.

An update controller 203 designates a space index tree to be updated to a space index register 204 when an object is newly registered, and designates a space index tree to be updated to a space index deleter 205 when an object is deleted. The space index tree to be updated is the detail space index tree and the heap detected by the update target cache determiner 202 and the whole space index tree.

The space index register 204 and the space index deleter 205 register or delete an object for the target designated by the update controller 203.

The transmitter 111 transmits whether all the above-described processing can be performed without any problem to the communication interface 105.

The object retrieval apparatus as described above may also be realized using a general-purpose computer device as basic hardware. That is, each function block (or each section) in the object retrieval apparatus can be realized by causing a processor mounted in the above general-purpose computer device to execute a program. In this case, the object retrieval apparatus may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

The terms used in each embodiment should be interpreted broadly. For example, the term "processor" may encompass a general purpose processor, a central processor (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

The term "storage" may generally encompass any device which can memorize data permanently by utilizing magnetic technology, optical technology or non-volatile memory such as an HDD, an optical disc or SSD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An object retrieval apparatus comprising:
a storage to store first to N-th space index information relating to $X_1$ objects to $X_N$ (where N is an integer of 2 or greater) objects each set of which are selected in a descending order of an object size from among a plurality of objects disposed in three dimensional space, and in which a value of $X_T$ (where T is a value from 1 to N) decreases as a value of T increases; and
a retrieval processor to divide a sight range into a plurality of pieces according to distance from a sight point in the three dimensional space, assign a different one of the first to N-th space index information to each divided range such that a smaller index number of space index information of the first to N-th space index information is assigned to the divided range closer to the sight point, and specify an object having a size visible from the sight point among objects existing in each divided range by retrieving the space index information assigned to each divided range.

2. The apparatus according to claim 1, wherein
the retrieval processor assigns X-th space index information to a first range in the sight range, and assigns Y-th space index information to a second range which is adjacent to the first range and which is farther from the first range, and
calculates a longest distance at which an object of a minimum size among objects held by the Y-th space index information is visible from the sight point and divides between the first range and the second range according to the longest distance.

3. The apparatus according to claim 1, wherein the retrieval processor sequentially performs retrieval from the divided range closer to the sight point, and excludes an object which has a size visible from the sight point but is invisible because the object is located at a blind spot of another object specified in retrieval of the divided range or in retrieval of another divided range closer to the sight point than divided the range.

4. The apparatus according to claim 1, wherein the retrieval processor sequentially performs retrieval from the divided range closer to the sight point, and, when there is an object which becomes invisible from the sight point among objects which have already been specified due to being located at a blind spot of a newly specified object, excludes the object.

5. The apparatus according to claim 1, wherein
the first space index information to N-th space index information each have a tree structure, and the tree structure assigns all objects indicated in space index information corresponding to the tree structure to leaf nodes different from each other, and a root node and intermediate nodes each has information of a cuboid enclosing a whole of objects assigned to all the leaf nodes existing in a lower layer than a layer of each of the root node and the intermediate nodes, and
the retrieval processor determines whether the cuboid corresponding to the root node of the tree structure corresponding to the divided range interferes with the divided range in retrieval for each of the ranges,
when the cuboid interferes with the divided range, performs similar processing repeatedly on nodes in lower layers than the layer of the root node, and when the processing reaches a leaf node and it is determined that an object corresponding to the leaf node interferes with the divided range, judges that the object exists within the divided range,
when the object does not interfere with the divided range, does not perform processing on nodes in further lower layers than a layer of the root node or the nodes in the lower layers, or, when a node which is determined as a node which does not interfere with the divided range is a leaf node, judges that an object corresponding to the leaf node does not exist in the divided range.

6. The apparatus according to claim 1, further comprising a receiver to receive a request of registration or deletion of an object,
wherein the first space index information to N-th space index information respectively include information relating to objects of a given number,
the storage stores first to N-th index information configured to dispose objects indicated by each of the first to N-th space index information under a predetermined rule according to sizes of the objects, and
the retrieval processor specifies an object of a minimum size from the index information corresponding to at least one of the first to N-th space index information
compares a size of the specified object with a size of the object indicated in the request for registration, to thereby specify the space index information and the index information which need to be updated among the first to N-th space index information and the first to the N-th index information, and
updates the specified space index information and the specified index information based on information of the object indicated in the request of registration.

7. The apparatus according to claim 1, further comprising a receiver to receive a retrieval request including information relating to a positional vector of the sight point in the three dimensional space and a directional vector of a sight line and a degree of a sight angle,
wherein the sight point and the sight range are determined in the three dimensional space based on the retrieval request.

8. The apparatus according to claim 1, further comprising a transmitter to transmit data indicating the objects specified by the retrieval processor to an external device.

9. The apparatus according to claim 1, wherein the $X_1$ to $X_N$ (where N is an integer of 2 or greater) objects are a given number of largest objects or a given percentage of largest objects, among a plurality of objects in the three dimensional space.

10. An object retrieval method executed by a computer, comprising:
dividing a sight range into a plurality of pieces according to distance from a sight point in a three dimensional space:
assigning a different one of the first to N-th space index information to each divided range such that a smaller index number of space index information of the first to N-th space index information is assigned to the divided range closer to the sight point wherein the first to N-th space index information include information relating to $X_1$ objects to $X_N$ (where N is an integer of 2 or greater) objects each set of which are selected in a descending order of an object size from among a plurality of objects disposed in three dimensional space, and in which a value of $X_T$ (where T is a value from 1 to N) decreases as a value of T increases; and
specifying an object having a size visible from the sight point among objects existing in each divided range by retrieving the space index information assigned to each divided range.

* * * * *